United States Patent [19]

Stanford

[11] Patent Number: 4,997,465
[45] Date of Patent: Mar. 5, 1991

[54] ANTI-FLUIDIZATION SYSTEM FOR MOLECULAR SIEVE BEDS

[75] Inventor: Raymond A. Stanford, Rock Island, Ill.

[73] Assignee: VBM Corporation, Louisville, Ky.

[21] Appl. No.: 320,960

[22] Filed: Mar. 9, 1989

[51] Int. Cl.$^5$ .............................................. B01D 53/04
[52] U.S. Cl. ...................... 55/179; 55/389; 55/475; 55/513; 210/350
[58] Field of Search .............. 55/179, 387, 389, 475, 55/513; 210/350-352, 198.2

[56] References Cited

U.S. PATENT DOCUMENTS

| | | | |
|---|---|---|---|
| 817,252 | 4/1906 | Kneuper | 210/350 X |
| 3,180,825 | 4/1965 | Couvreur et al. | 210/350 X |
| 3,186,150 | 6/1965 | Zankey | 55/475 X |
| 3,838,977 | 10/1974 | Warren | 55/475 X |
| 3,965,000 | 6/1976 | Mikule et al. | 210/351 X |
| 4,029,486 | 6/1977 | Frantz | 55/475 X |
| 4,108,617 | 8/1978 | Frantz | 55/389 X |
| 4,131,442 | 12/1978 | Frantz | 55/475 X |
| 4,162,146 | 7/1979 | Seibert | 55/389 X |
| 4,250,035 | 2/1981 | McDonald et al. | 210/198.2 |
| 4,261,715 | 4/1981 | Frantz | 55/475 X |
| 4,294,699 | 10/1981 | Herrmann | 210/351 X |
| 4,321,069 | 3/1982 | Ritter | 55/387 X |
| 4,336,042 | 6/1982 | Frantz et al. | 55/475 X |
| 4,337,153 | 6/1982 | Prior | 210/350 X |
| 4,496,376 | 1/1985 | Hradek | 55/389 X |
| 4,552,571 | 11/1985 | Dechene | 55/389 X |
| 4,636,226 | 1/1987 | Canfora | 55/389 X |
| 4,673,415 | 6/1987 | Stanford | 55/389 X |
| 4,764,346 | 8/1988 | Lewis et al. | 55/387 X |
| 4,826,510 | 5/1989 | McCombs | 55/475 X |

FOREIGN PATENT DOCUMENTS

| | | | |
|---|---|---|---|
| 2413110 | 8/1979 | France | 210/198.2 |
| 0837363 | 6/1960 | United Kingdom | 210/198.2 |

Primary Examiner—Robert Spitzer
Attorney, Agent, or Firm—Fay, Sharpe, Beall, Fagan, Minnich & McKee

[57] ABSTRACT

A valve assembly (B) cycles compressed gas from a compressor (A) to a pair of molecular sieve beds (C) to perform a pressure swing adsorption gas separation cycle. Each bed includes a peripheral outer wall (20) and has a tubular member (30) extending down a central axis thereof. An extensible sleeve (26) surrounds the central tube and is in fluid communication therewith by way of an aperture (32). A fluid amplifier (F) amplifies fluid pressure from system gases, particularly the gases from the compressor, and uses the amplified pressure to expand the extensible sleeve. Particles (22) of zeolite material are inhibited from becoming fluidized and moving with fluid flows by the clamping pressure between the extensible sleeve and the peripheral wall of the bed.

21 Claims, 3 Drawing Sheets

4,997,465

ANTI-FLUIDIZATION SYSTEM FOR MOLECULAR SIEVE BEDS

BACKGROUND OF THE INVENTION

The present invention relates to the art of restraining particulates that are subject to the forces of gas or fluid flow. It finds particular application in conjunction with restraining zeolite particles in the adsorption beds of pressure swing adsorption (PSA) gas concentrators and will be described with particular reference thereto. It is to be appreciated, however, that the present invention may find utility in conjunction with other types of gas concentrators and gas concentration cycles as well as with other fluid treatment operations, such as filters, catalysts, ion exchange systems, and the like.

Heretofore, pressure swing adsorption gas concentrators have commonly included first and second molecular sieve beds connected by a cross over valve to an air compressor. The beds are filled with particles of a zeolite, carbon, or other material which adsorbed selected component(s) of the air, e.g. nitrogen, received at an input port while allowing other components, e.g. oxygen, to pass through the bed to an output port. In some concentrators, the beds have layers or strata of particulates with different characteristics.

The cross over valve cyclically supplied atmospheric air under pressure to the input port of one of the beds while purging the other bed by venting or drawing a vacuum on its input port. A small part of the separated oxygen from the output port of the bed receiving the air under pressure is fed back to the output port of the bed being purged.

These changes in pressure and flow tend to cause an unwanted movement of the zeolite particles. The movement rubs the particles together abrading them. The abrading of the particles creates smaller particles which are even more mobile, hence accelerating the abrading.

One prior art solution was to apply an axial compressive force on the cylindrical molecular sieve beds. For example, the molecular sieve bed was housed in a cylindrical housing in which one or both of the ends could be moved axially. After the bed was filled with zeolite, the ends were pressed together and locked. One of the problems with axial pressure is that the effect of the clamping force was dissipated and became ineffectual within a short distance. The particles compact into a bridge that protects interior regions from the pressure. Moreover, when the particles became smaller due to abrading, they filled voids and packed more tightly, relieving the clamping pressure. During normal use of a pressure swing adsorption system, the beds receive various thermal forces, vibration, and the like, which tend to cause undesirable movement of the particles. Moreover, the thermal expansion, the abrading and settling of particles, the introduction of compressed air, and the like tend to defeat or relieve the clamping force.

The use of spring clamping systems to apply a continuing longitudinal spring bias also tended to be ineffective. Again, the spring force was dissipated within a short distance allowing the particles at some distance from the spring to move. The particles under pressure adjacent the spring would pack together and form a bridge which blocked the spring force from reaching particles beyond the bridge from the spring. Thus, the particles at the center of the cylinder still abraded, packed together, formed voids, and thus increased the mobility of the particles.

The present invention provides a new and improved particulate anchoring system which overcomes the above referenced problems and others.

SUMMARY OF THE INVENTION

In accordance with one aspect of the present invention, a sieve bed is provided. The sieve bed is a closed, generally cylindrical container which has a peripheral wall and is substantially filled with a particulate molecular sieve material. An elongated radially extensible member is disposed through the container generally parallel to the peripheral wall. A means is provided for selectively radially expanding the radially expansible element to compress the particulate material between the radially expansible element and the peripheral wall.

In accordance with another aspect of the present invention, the sieve bed is a closed container which has a peripheral wall and is substantially filled with particles of molecular sieve material. An expansible member is disposed generally centrally in the container. A means is provided for expanding the expansible member to compress the particulate material between the expansible member and the peripheral wall.

In accordance with a more limited aspect of the present invention, the sieve bed is incorporated in a pressure swing adsorption gas concentrating system. A means is provided for cyclically supplying a gaseous mixture to and removing an adsorbed gaseous component from the sieve bed.

In accordance with a yet more limited aspect of the invention, the means for expanding the expansible member derives pressure from the cyclically supplied gaseous mixture. In this manner, the pressure with which the expansible member is expanded is determined at least in part by the pressure of the gaseous mixture. An increase in the gaseous mixture pressure causes a corresponding increase in the expansion pressure to maintain the compression of the particles.

A primary advantage of the present invention is that it immobilizes granular materials through which fluid passes. The invention also breaks apart particle bridging that might block particle immobilizing forces.

Another advantage of the present invention is that it extends zeolite bed life in gas concentrating systems.

Yet another advantage of the present invention is that it is self compensating for fluctuations in fluid pressure.

Still further advantages of the present invention will become apparent to those of ordinary skill in the art upon reading and understanding the following detailed description of the preferred embodiment.

BRIEF DESCRIPTION OF THE DRAWINGS

The invention may take form in various components and arrangements of components and in various steps and arrangements of steps. The drawings are only for purposes of illustrating a preferred embodiment and are not to be construed as limiting the invention.

DETAILED DESCRIPTION OF THE PREFERRED EMBODIMENT

Figure 1:
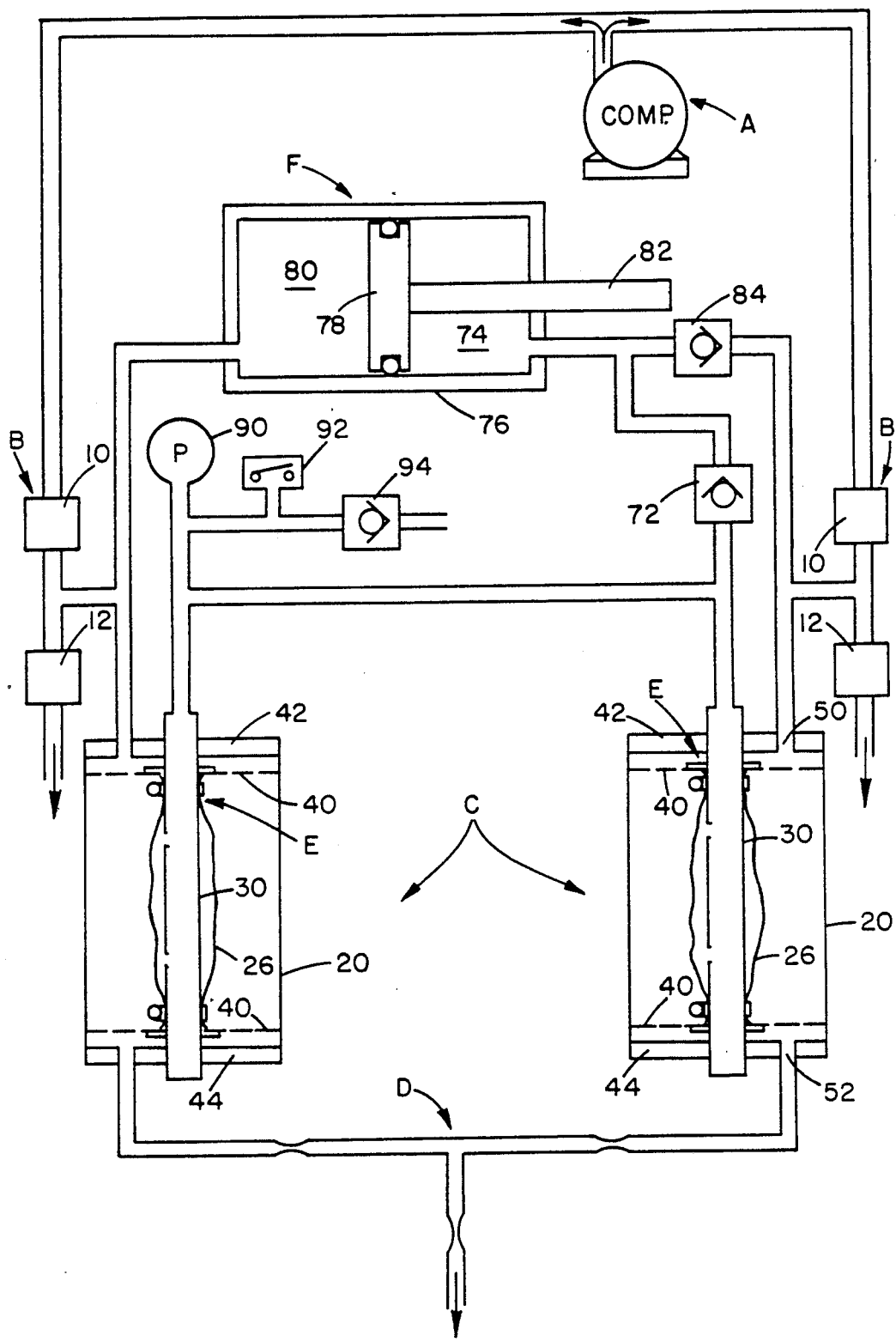
FIG. 1 is a pressure swing adsorption gas concentrating system incorporating the present invention.

With reference to FIG. 1, a compressor A supplies a gaseous mixture, such as atmospheric air, under pressure to a valving system B. The valving system cyclically supplies the compressed gaseous mixture to one or more molecular sieve beds C and vents or purges the other bed or beds.

Each bed adsorbs one or more gases of the mixture, such as nitrogen, while passing another gas, such as oxygen. During the purge cycle, the interior of the bed is vented to atmosphere or connected to a vacuum side of the compressor A to discharge the adsorbed gas from the bed. Primary product gas, oxygen in the illustrated embodiment, is passed from the beds to a primary product gas outlet D.

Each bed includes an anti-fluidization means E for inhibiting mobility and fluidization of the zeolite particles within each bed. More specifically to the preferred embodiment, a pressure amplifier F amplifies the pressure of the gaseous mixture received from the compressor. The amplified fluid pressure is connected with the anti-fluidization means to provide the motive force for holding the zeolite particles firmly against movement.

The valving means B includes a cross over valve means that includes a bed inlet valve 10 for each bed and an exhaust valve 12 for each bed. The inlet and exhaust valves are cycled alternately such that one of the beds is connected with the inlet valve while the other bed is connected with the exhaust valve.

Figure 2:
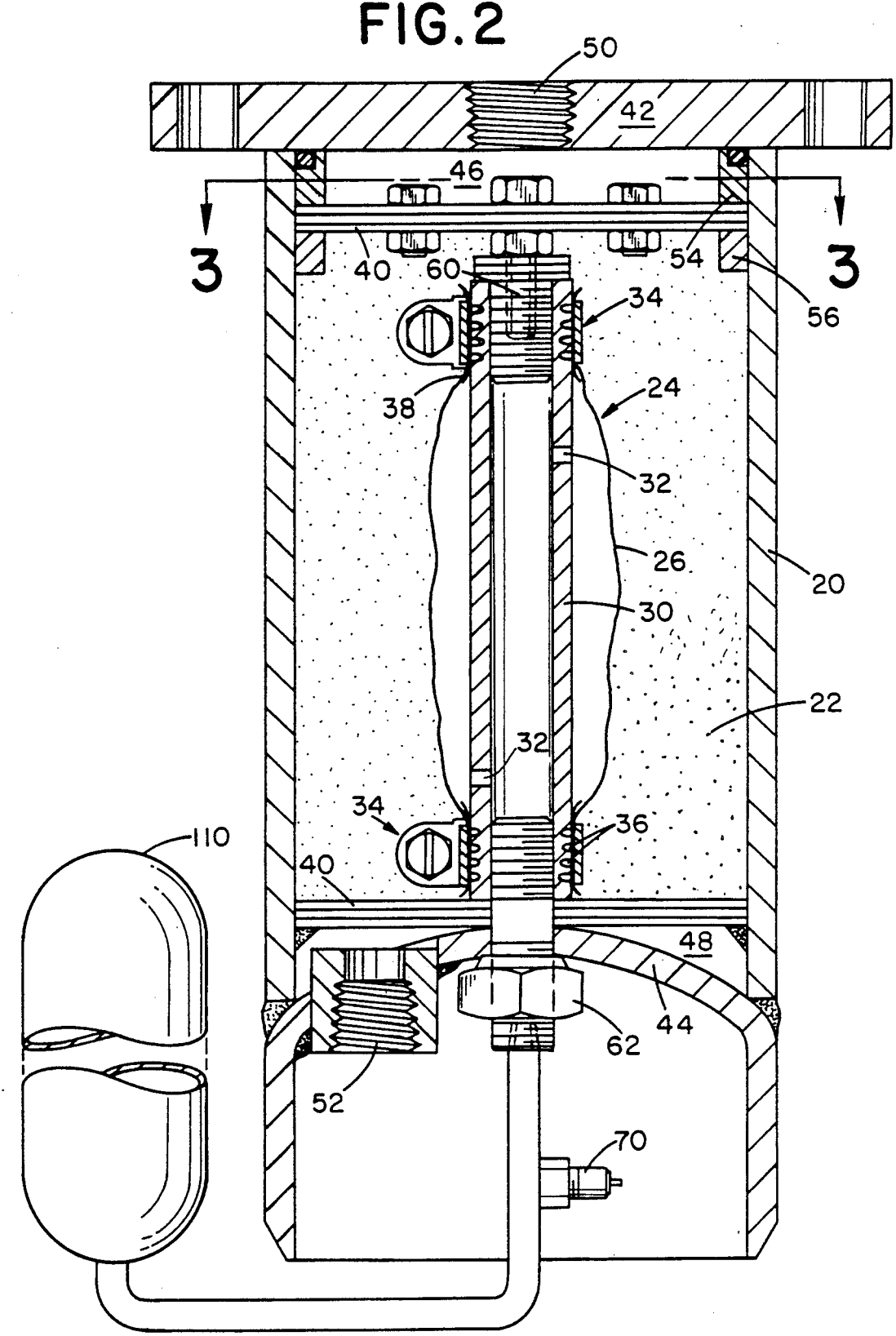
FIG. 2 is a side sectional view of the zeolite bed in accordance with the pressure invention.
Figure 3:
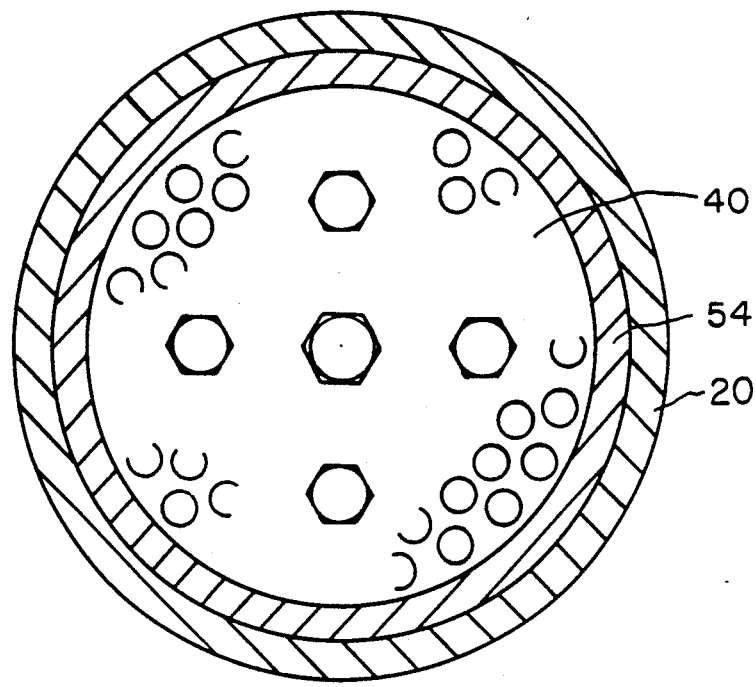
FIG. 3 is a view taken through section 3—3 of FIG. 2.

With continuing reference to FIG. 1 and further reference to FIG. 2, each molecular sieve bed C includes an elongated, generally cylindrical outer wall 20. Particles 22 of granular zeolite fill the space inside the walls. The anti-fluidizing means E includes an air spring or other radially extensible member 24 disposed axially along the center of the cylindrical peripheral wall. The extensible member is urged under pressure, e.g. pneumatic pressure, outward from a collapsed or relaxed configuration. The outward radial expansion is inherently anti-bridging. Any bridging is separated and distributed by the radial expansion of the expansible member.

The illustrated embodiment, the expansible member includes a rubber or other elastomeric bladder or sleeve 26 which expands radially when subject to an internal pressure. Alternately, a non-elastomeric bladder can be expanded from a folded or compressed configuration back toward a less folded or relaxed configuration. The radial extension presses the zeolite particles between the bladder and the peripheral wall to lock them into a preselected position. The expansible bladder may be selectively expanded and contracted during filing of the bed to assist in compacting the zeolite.

The distance between the bladder and the outer wall is determined by anticipated volumetric compaction or settling and the expansion capacity of the bladder. The anticipated compaction of the particulate zeolite should not exceed the ability of the extensible number to expand. The bladder extends axially to within a half peripheral wall diameter of the axial ends of the sieve material 22 to insure that radial forces reach to the axial extremes of the sieve material.

Looking still to the preferred embodiment, a hollow rigid tube 30 extends centrally through the container or bed parallel to the peripheral wall 20. The tube has one or more apertures 32 which provide pressure communication from the inside of the tube to the outside. The sleeve 26 surrounds the rigid tube and is sealed thereto at opposite ends by a sealing means 34, such as radially compressive clamps. The tube 30 may have peripheral grooves 36 to improve the sealing interaction with the bladder. A shield 38 may be provided between the radial clamp and the sleeve to inhibit the clamp from cutting the sleeve or otherwise creating a situation which causes premature failure. Numerous other sealing arrangements, such as those in which internal sleeve pressure increases sealing with a peripheral mounting element, are also contemplated.

A pair of screen assemblies 40 are mounted at opposite ends of the bed to the bed or central shaft. The screen assemblies function as a means for restraining the zeolite particulate from movement along the central axis. The screen assemblies also hold the zeolite particulate away from a top end wall 42 and a bottom end wall 44 to provide a ready air passages 46, 48 to inlet and outlet ports 50, 52. Each of the screen assemblies include at least one layer of a stiff, structurally strong material that withstands pressure from the zeolite due to the compression thereof, and a fine screen which holds the zeolite material in place. In the illustrated embodiment, a plurality of bolts clamp two layers of the structurally strong material with relatively large apertures together with a fine mesh screen in between.

One of the end wall and the screen assembly includes a stand-off means for maintaining the spaces between the screen assemblies and the end walls. A top stand-off means may also include stops 54 in the peripheral wall which limit outward axial movement of the top screen assembly. Complementary stops 56 on the peripheral wall 20 interact with the stops 54 to fix the position of the top screen assembly. Further to the illustrated embodiment, an arched configuration of the bottom wall 44 provides the stand-off means for the lower screen assembly. Alternately, the screen assemblies may be held in position by tube 30. The center tube may also support the end caps 42, 44, function as a structured support for the bed, provide a convenient mounting assembly for mounting the bed to associated structures, or the like.

In the preferred embodiment, the central shaft 30 is threaded at each end to receive an upper mounting plug 60 and exterior lower nut 62. The nut fixes the tube and screen assemblies to the lower wall 44. In the illustrated embodiment, the lower nut 62 directly engages the lower wall, which in turn engages the lower screen assembly to fix the screens such that they restrain movement of the sieve and contain the pressure. The center tube 30 may be eliminated if unnecessary to a differing structural configuration.

The expansible member enables the zeolite to be sufficiently compacted during filling that axial compression is unnecessary. After the bed is filled and tamped, the member is expanded to compress the zeolite against the outer wall. The bladder may be expanded under constant pressure or pulsed. When the member is deflated the annular gap around the center is filled with more zeolite. This radial compaction and fill cycle is repeated as needed. This compaction of the zeolite before installation of the top screen and end caps not only simplifies zeolite loading but also facilitates screen and top cap installation. The screens need only be positioned against the zeolite with sufficient firmness to restrain it under various pressures and mechanical forces. It is unnecessary to apply the mechanical force required to effect significant axial compression of the zeolite.

Other extensible systems may also be utilized. For example, if the height and width of the tank are substantially the same, a generally spherical bladder may be disposed in the center of the bed to apply compressive forces along three dimensions. As yet another option, the bladder may be two flat sheets of a flexible material which substantially span one dimension of the bed. Under internal pressure, the sheets may move outward to apply compressive forces substantially perpendicular to their surfaces, i.e. along one dimension. In this manner, the bladder may apply a one dimensional rather than two or three dimensional compressive force. Other air springs, expansible bladders, extensible members, and the like may be utilized to provide one, two, and three dimensional compressive forces relative to the end and side walls of the bed.

The central tube 30 of each bed includes a Schrader valve 70 in an inlet end or a connection with a pressure amplifier means F. With reference to FIG. 1, more specifically, a check valve 72 connects the inlets of the expansible members with a high pressure chamber 74 of a piston cylinder assembly 76. The check valve allows high pressure to flow from the pressure amplifier into the bladder but prevents flow in the opposite direction. The pressure amplifier includes a cylinder 76 in which a piston 78 is slidably mounted. The cylinder has a larger surface area facing a low pressure chamber 80 and a smaller surface area facing the high pressure chamber 74. In the preferred embodiment, this surface area differential is achieved with a cylinder rod 82 which extends from the high pressure side of the piston to reduce the surface area facing the high pressure chamber. The pressure amplification is generally in proportion to the ratio of the surface areas of the piston facing the high and low pressure chambers. Thus, by enlarging the diameter of the piston rod, the pressure amplification can be increased.

The low pressure chamber 80 is connected with the cross over valving means B to receive the compressed gaseous mixture therefrom. More specifically, the low pressure chamber is connected with the input port of one, but not both of the beds. In this manner, each time that bed is connected with the compressor, the low pressure chamber 80 is pressurized, causing the high pressure chamber 74 to pump higher pressure fluid past check valve 72 into the extensible members. The check valve 72 holds the extensible members at the high pressure when the low pressure chamber 80 is depressurized on the purging portion of each cycle. Another check valve 84 connects the high pressure chamber with the input of the other bed. When the first bed is being purged and the low pressure chamber is vented, the check valve 82 allows the gaseous mixture being pumped into the second bed to be diverted in part to the high pressure chamber. This replenishes any gas which might leak through the extensible member, fittings, valves, or tubing portions of the assembly.

It will be noted that if the pressure of the gaseous mixture increases, then the pressure in the low pressure chamber 80 will also increase. This higher pressure will be amplified by the same proportion raising the pressure into the expansible members accordingly. In this manner, the pressure exerted by the air springs to hold the particulate materials against fluidization increases with increases in the pressure of the fluid moving through the beds or reservoirs. If the pressure of the gases flowing into the beds is decreased, the operating pressure for the expansible members will also decrease with time due to bladder and system leakages.

A pressure gauge 90 is connected with the high pressure side of the extensible members to provide an observable reading of the gas pressure therein. A differential pressure switch 92 prevents operation of the system when the extensible members are not pressurized to a preselected level. For example, switch 92 may prevent cycling of cross over valves 10 and 12 until the expansible members are fully pressurized. A check valve controlled fill port 94 provides an auxiliary access to the expansible members or gas springs to enable them to be filled manually from an outside pressure source.

Figure 4:
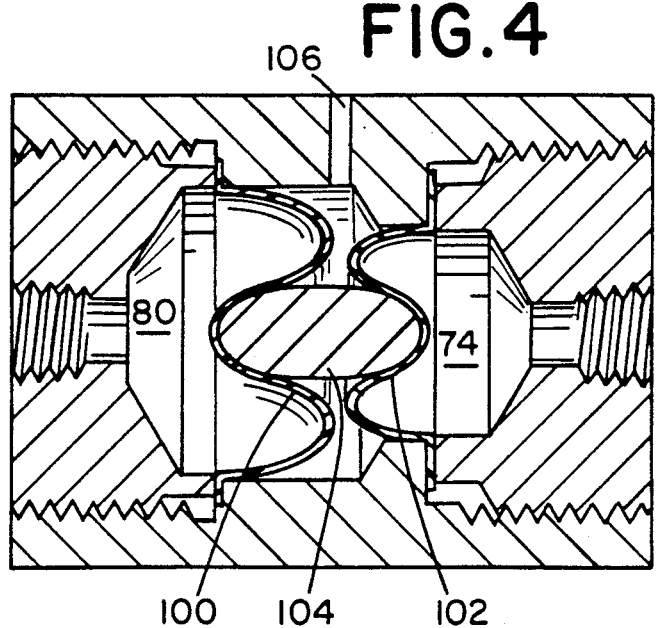
FIG. 4 is a cross sectional view of an alternate pressure amplifier for the system of FIG. 1.

With reference to FIG. 4, other pressure amplifiers may, of course, be utilized. For example, the low pressure chamber 80 may be defined in a first rolling diaphragm 100 and the high pressure chamber may be defined in a second rolling diaphragm 102. A push rod 104 interconnects the two diaphragms to transfer force from one to the other. The low pressure diaphragm is larger in diameter than the high pressure diaphragm by an amount selected in accordance with the desired pressure ratio. The rolling diaphragm embodiment is advantageous in that a very low friction and leakage are encountered. A vent 106 assures that a negligible and common pressure is provided between the two diaphragms by venting any build up of pressure which might tend to negate pressure intensification or to invert the diaphragms.

Optionally, direct fluid communication tubing and valves may be provided for connecting the pressure amplifier F directly with the compressor A or another source of pressure. If high pressure is always available, e.g. directly from the compressor A then the source of higher pressure may be connected directly to the check valve 72. A pressure regulator valve, when supplied with adequate pressure, may replace check valve 72 and amplifier means F. As yet another alternative, the pressure amplifier may maintain a tank or reservoir at the higher pressure. The check valve 72 or the pressure regulator valve connects the high pressure tank with a check valve.

With reference again to FIG. 2, as yet another alternative, a tank 110, or the extensible member itself, may contain a gas-vapor-liquid medium which supplies its vapor at such pressure as to accomplish the desired restraint. Such a liquid vapor system serves to provide a considerable reserve against leakage, while maintaining an essentially constant, though temperature dependent, pressure as long as any liquid phase remains.

The invention has been described with reference to the preferred embodiments. Obviously, further modifications and alterations will occur to others upon reading and understanding the preceding specification. It is intended that the invention be construed as including all such alterations and modifications insofar as they come within the scope of the appended claims or the equivalents thereof.

Having thus described the preferred embodiments, the invention is now claimed to be:

1. A pressure swing adsorption gas concentrating system comprising:
   a means for cyclically supplying a gaseous mixture to and removing an adsorbed gaseous component from at least one molecular sieve bed over wide cyclic swings of pressures;
   the sieve bed including:

a closed, generally cylindrical container having peripheral and end walls, defining a first port through which the gaseous mixture cyclically flows into the container and the adsorbed gases flow in an opposite direction out of the container, defining a second port through which separated gases flow out of the container, and being substantially filled with a particulate molecular sieve material;

a radially extensible member disposed along the container generally parallel to the peripheral wall;

an expanding means for radially expanding the member and maintaining the member expanded over the wide swings of pressures, both as the gaseous mixture flows into the container and as the adsorbed gases flow out of the container to provide a compressive force between the member and the peripheral wall which holds the particulate material against becoming fluidized even as the gaseous mixture flows in and the adsorbed gas flows out through the first port causing the pressure in the sieve bed to undergo the wide swings.

2. The system as set forth in claim 1 wherein the expansible member includes an inflatable sleeve and the expanding means includes means for supplying fluid under pressure into an interior of the sleeve.

3. The system as set forth in claim 2 wherein the sleeve is cylindrical with a major axis disposed parallel to a major axis of the closed container.

4. The system as set forth in claim 3 further including a tubular, central support extending centrally through the sleeve, the central support being connected with the fluid pressure supplying means and having at least one passage therethrough to provide fluid communication with the sleeve interior.

5. The system as set forth in claim 4 further including first and second screen assemblies disposed adjacent opposite ends of the container and a means for fixing the screen assemblies against axial separation.

6. The system as set forth in claim 2 wherein the means for supplying fluid under pressure includes a pressure amplifier having an input end operatively connected with the means for supplying fluid under pressure for receiving fluid therefrom under pressure and an output end for supplying the fluid under a higher pressure to the sleeve.

7. The system as set forth in claim 6 wherein the pressure amplifier includes a low pressure chamber operatively connected with the supply means for cyclically receiving the fluid under pressure therefrom and a high pressure chamber connected through a first one way valve means to the sleeve, and a second one way valve means operatively connected between the fluid supply means and the high pressure chamber.

8. The system as set forth in claim 1 further including first and second screen assemblies disposed adjacent opposite ends of the container in a fixed axially spaced relationship.

9. A bed assembly which receives a nonconstant fluid flow cyclically into and out of the bed in which fluid pressure within the bed cyclically varies between high and low pressure extremes, the bed comprising:

a closed, generally cylindrical container having a cylindrical peripheral wall and oppositely disposed end walls in a fluid sealing relationship to the peripheral wall, a fluid access port being defined adjacent each end wall, the container being substantially filled with a particulate material;

a radially extensible member disposed along the container generally parallel to a central axis of the cylindrical peripheral wall;

means for expanding the member with a substantially constant pressure and holding the member expanded with the substantially constant pressure over a multiplicity of cycles of the high and low fluid pressure extremes.

10. The system as set forth in claim 9 wherein the extensible member includes an inflatable sleeve and further including a means for supplying fluid under pressure into an interior of the sleeve, whereby inflating the sleeve compresses the particulate material and breaks apart any particulate material bridges.

11. The system as set forth in claim 10 further including a tubular, central support extending centrally through the sleeve, the central support being connected with the fluid pressure supplying means and having at least one passage therethrough to provide fluid communication with the sleeve interior.

12. The system as set forth in claim 9 further including a means for restraining the particulate material against motion in a direction parallel to the central axis.

13. The system as set forth in claim 9 wherein the means for supplying fluid under pressure includes a pneumatic pressure amplifier having a low pressure and operatively connected with a means for cyclically supplying a gaseous mixture to one of the fluid access ports and a high pressure end for supplying fluid under a higher pressure to the extensible member.

14. A gas concentrating system comprising:
a means for cyclically supplying a gaseous mixture to and removing an adsorbed gaseous component from at least one molecular sieve bed such that an interior of the bed is subject to a wide pressure swing in each of a multiplicity of cycles;
the bed including:
a closed container substantially filled with a particulate molecular sieve material;
an extensible member disposed generally centrally within the container; and,
a means for continuously expanding the extensible member to compact the particulate material continuously through each of the multiplicity pressure swing of cycles between the extensible member and the container to inhibit fluidization and cyclic abrasion of the particulate material.

15. The system as set forth in claim 14 further including a pneumatic pressure amplifier having a low pressure side operatively connected with the means for cyclically supplying the gaseous mixture and a high pressure side for supplying the gaseous mixture under a higher pressure to the extensible member.

16. The system as set forth in claim 15 further including a one way valve means operatively connected between the high pressure side of the amplifier and the extensible member.

17. A bed assembly for receiving a fluctuating fluid flow therethrough whose pressure fluctuates between high and low pressure extremes, the bed comprising:
a closed container having generally oppositely disposed fluid access ports, the closed container being substantially filled with a particulate material;
an extensible member disposed generally centrally within the container such that expansion of the extensible member compacts the particulate material between the extensible member and the container to inhibit fluidization of the particulate materials;

a means for continuously expanding the member with a pressure at least as high as the high pressure extreme even as the fluid flow drops to the low pressure extreme.

18. The bed as set forth in claim 17 further including screen assemblies disposed adjacent each fluid access port for holding the particulate material in a spaced relationship thereto.

19. The bed as set forth in claim 17 wherein the extensible member expands along two dimensions and further including a means for restraining movement of the particulate materials along a third dimension.

20. The bed as set forth in claim 19 wherein the restraining means includes a pair of screen assemblies disposed at opposite ends of the container in a fixed, spaced relationship along the third dimension.

21. A pressure swing adsorption gas concentrating system comprising:

a means for cyclically supplying a gaseous mixture to and removing an adsorbed gaseous component from at least one molecular sieve bed with a cyclically changing pressure swing that causes the adsorbed gaseous component to be adsorbed during a portion of each cycle that the gaseous mixture is supplied and de-adsorbed during a portion of each cycle in which the adsorbed gaseous component is removed;

the sieve bed including:
a closed, generally cylindrical container having a peripheral wall and being substantially filled with a particulate molecular sieve material;
an extensible member disposed along the container generally parallel to the peripheral wall;

a liquid and vapor system in which a liquid and its vapor have a relatively constant vapor pressure relationship independent of the cyclically changing bed pressure, the liquid being disposed in at least one of the extensible member and a reservoir in fluid communication with the extensible member, the liquid and vapor system being in vapor communication with the extensible member such that the relatively constant vapor pressure expands the extensible member against the particulate material with a relatively constant force to hold the particulate material against cyclic fluidization and abrasion.

* * * * *